United States Patent Office 3,618,296
Patented Nov. 9, 1971

3,618,296
METHOD FOR THE SEPARATION OF CARBON FROM SYNTHESIS GAS UNDER HIGH PRESSURE
Werner Auer, Heidelberg, Heinz Hauser, Limburgerhof, and Walter Knobloch, Mannheim, Germany, assignors to Texaco Development Corporation, New York, N.Y.
Filed July 18, 1969, Ser. No. 843,008
Int. Cl. B01d 47/00
U.S. Cl. 55—93                           3 Claims

ABSTRACT OF THE DISCLOSURE

Synthesis gas obtained by partial oxidation of liquid hydrocarbons at high pressure and containing entrained by-product carbon and metal salts is contacted with separately introduced streams of acidic carbon-containing water and alkaline clear water in a contacting device in which the gas stream is accelerated prior to introduction of the aqueous streams.

BACKGROUND OF THE INVENTION

This invention relates to a process for the generation of synthesis gas, i.e, carbon monoxide and hydrogen, by partial oxidation of liquid hydrocarbons wherein free carbon in the product gas stream is removed by contacting the carbon particles with water. In one of its more specific aspects, this invention relates to an improved method for contacting carbon contained in synthesis gas with aqueous process streams.

It is known that in converting hydrocarbons, e.g., crude oil or heavy fuel oil, to synthesis gas under high pressure by partial oxidation with steam and oxygen, a synthesis gas mixture is obtained which contains free carbon that has to be separated from the gas. This separation has been effected by contacting the carbon-containing gas mixture coming from the reactor with water, e.g., in a venturi nozzle and subsequently removing the resulting moistened carbon in a wash column in which the gas stream is contacted with additional water (e.g. as shown in 2,960,476 to Du Bois Eastman et al.), a portion of the carbon-containing water settled in the sump of the wash column is recycled and atomized in the venturi nozzle. Clean make-up water is also introduced into the venturi nozzle where the carbon-containing water and the clean water are mixed ahead of the venturi nozzle in accordance with previously known methods of operation, the precipitation of metal salts causes plugging of the water feed lines to the scrubber resulting in poorer carbon separation leading to difficulties in the further processing of the gas.

It has now been found that in the separation of carbon from synthesis gas in the aforementioned manner the difficulties caused by the separation of metal salts in the feed lines to the venturi nozzle can be avoided by separately introducing the carbon-containing water, which is recycled from the bottom of the wash column into the venturi nozzle, and the clear make-up water from a source designated hereinafter. In accordance with the present invention, hot synthesis gas containing carbon is contacted with carbon-containing water and with clear water separately introduced into the synthesis gas stream.

DESCRIPTION OF PREFERRED EMBODIMENT

Figure 1:
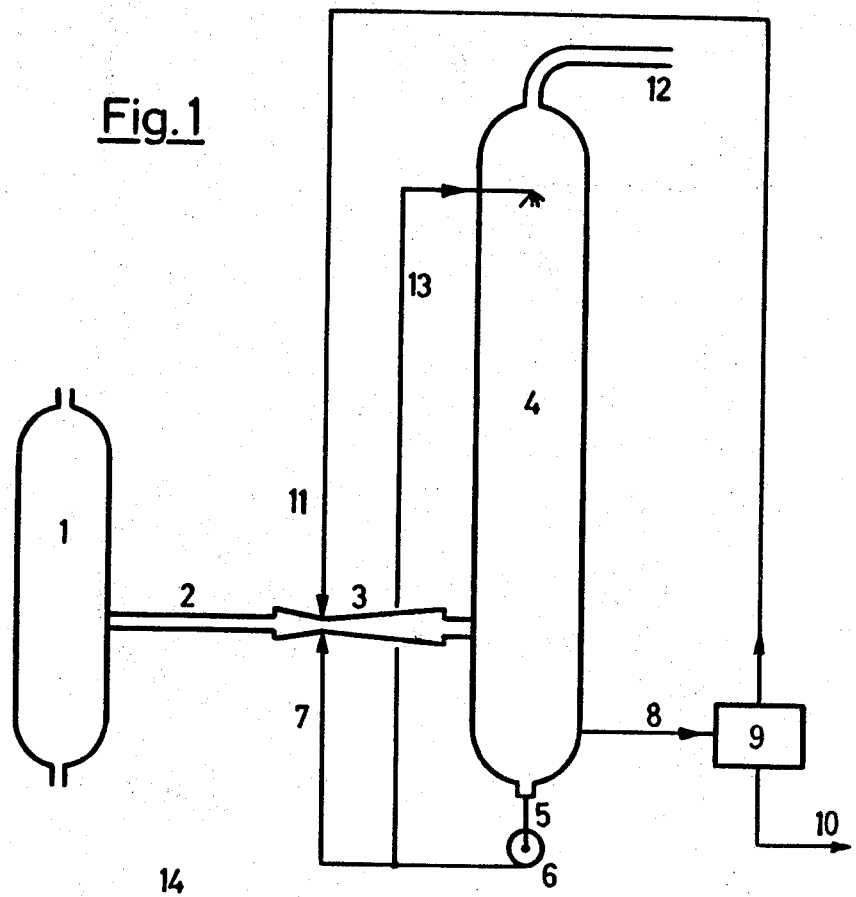
FIG. 1 illustrates diagrammatically an arrangement for carrying out the method of the invention.
Figure 3:
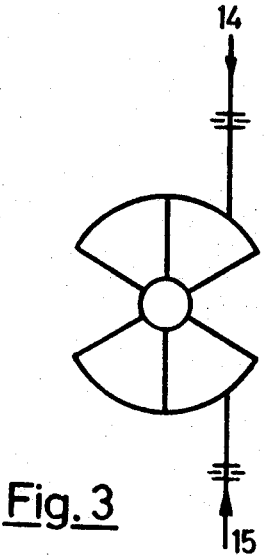
FIG. 3 illustrates diagrammatically the method of introducing carbon-containing water and clear water into hot synthesis gas in accordance with the present invention.

With reference to FIG. 1 of the drawing, cracked gases from the synthesis gas generator reactor 1, which are usually under high pressure and which contain steam and carbon, pass by way of line 2 to a venturi nozzle 3. There the carbon-containing gases are mixed with clear water from line 11 and a carbon-water mixture from line 7 in several, preferably three each, feed pipes (as illustrated in FIG. 3). From the venturi nozzle 3, the mixture then passes to wash column 4 where the carbon is separated from the gas. The gas purified of carbon leaves the wash column via line 12. In the bottom of the wash column, carbon-containing water collects. Carbon-containing water from column 4 passes by way of line 8 a separator device 9 in which the carbon is separated from the water. The carbon leaves the separator device by way of line 10. A portion of the carbon-containing water which has collected in the sump of the wash column 4 is withdrawn via line 5 and pump 6 and a portion of this is passed via line 13 to the top of the wash column where it is used for washing the carbon. The other portion of the mixture of carbon and water which is withdrawn via line 5 from the bottom of wash column 4 is recycled via line 7 to the venturi nozzle into which it is introduced through separate feed pipes (as illustrated in FIG. 3). In carrying out the process, an acidic medium often develops in some sections of the installation, e.g., in the carbon-containing water (typical pH 5–6) due to acidic constituents formed in the reaction, in other sections (e.g. the carbon removal section), an alkaline medium develops (e.g., typical pH range 7–9).

Figure 2:
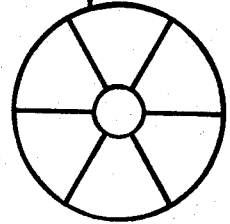
FIG. 2 illustrates diagrammatically a typical method of introducing carbon-containing water and clear water into hot synthesis gas in accordance with present practice in the art.

On merging the carbon-containing water and the acidic or alkaline water (in accordance with the prior art as illustrated in FIG. 2), iron or other metal constituents originating, e.g., in the ash of the oil, caused precipitates which resulted in plugging of the feed line. In the operating method according to this invention (as illustrated in FIG. 3), liquids having different pH values are separately introduced into the venturi nozzle, whereby it has been found surprisingly that the sudden equalization of the pH values do not lead to the difficulties of precipitate formation.

EXAMPLE

A gas stream of 120,000 Nm.$^3$/hr. (4,479,000 s.c.f./hr.) of synthesis gas which contains between 0.1 to 0.5 g. of carbon per Nm.$^3$ of gas (5.9 to 29.5 lbs. per million s.c.f.) is passed at pressure of 80 atm. and a temperature of 260° C. (500° F.) through a venturi tube. In the venturi tube 40 m.$^3$/hr. (10,567 gal./hr.) of acidic carbon-containing water and 40 m.$^3$/hr. (10,567 gal./hr.) of alkaline reacting clear water are introduced separately from lines 14 and 15 into this gas stream in an apparatus according to FIG. 3. No premixing of the two water streams prior to entering the venturi nozzle takes place, thereby, even after months of operation no deposits occurred.

If, however, the two water streams are mixed in an apparatus according to FIG. 2 prior to introduction, solid deposits are formed in the feed pipes to the venturi tube. The carbon removal from the synthesis gas is then no longer adequate, and after an operating period of 20 days the operation of the plant has to be interrupted for cleaning the feed pipes.

We claim:

1. A method of separating particulate carbon from synthesis gas produced by the partial oxidation of hydrocarbons at high pressure wherein carbon-containing synthesis gas at elevated temperature is contacted with aqueous fluid for separation of carbon therefrom which comprises accelerating said carbon-containing gas stream through the throat of a venturi, introducing into said accelerated gas stream in the throat of said venturi a stream of clear alkaline water and simultaneously a separate stream of an acidic carbon-water mixture produced subsequently in the process thereby scrubbing the particulate carbon from said gas stream and producing a washed gas stream, separating said washed gas stream from acidic carbon-water mixture in a gas-liquid separating zone, and recycling at least a portion of the acidic carbon-water mixture from the bottom of said gas-liquid separating zone to the throat of said venturi to wash said gas stream.

2. A process for separating free carbon from a synthesis gas mixture obtained by the partial oxidation of liquid hydrocarbons at high pressure comprising, passing the carbon-containing gas mixture axially through a venturi in which the gas stream is accelerated, introducing a stream of clear alkaline water as obtained subsequently in the process into said accelerated gas stream at the throat of said venturi, simultaneously introducing a stream of carbon-containing acidic water as obtained subsequently in the process into said accelerated gas stream at the throat of said venturi and at a point separated from said stream of alkaline water, introducing the effluent stream from said venturi into a wash column in counter current flow with a portion of the carbon-containing acidic water obtained from the bottom of said wash column, introducing a second portion of the carbon-containing acidic water obtained from the bottom of said wash column into the throat of said venturi as previously described, introducing a third portion of sad carbon-containing acidic water into a processing zone, removing carbon and alkalizing the water in said processing zone producing a stream of clear alkaline water, and introducing said stream of clear alkaline water into the throat of said venturi to contact said carbon-containing gas mixture as previously described.

3. The process of claim 2 wherein said stream of clear alkaline water and said stream of carbon-containing acidic water are introduced into the throat of said venturi through separate pipe assemblies each pipe assembly comprising a plurality of feed-in pipes.

References Cited

UNITED STATES PATENTS

| | | | |
|---|---|---|---|
| 2,967,588 | 1/1961 | Swart | 55—94 |
| 3,016,979 | 1/1962 | Schmid | 55—93 X |
| 3,057,605 | 10/1962 | Stone | 261—22 |
| 3,215,415 | 11/1965 | Stephens et al. | 261—118 |

REUBEN FRIEDMAN, Primary Examiner

R. W. BURKS, Assistant Examiner